United States Patent
Skovdal et al.

(10) Patent No.: US 11,885,306 B2
(45) Date of Patent: Jan. 30, 2024

(54) METHOD FOR DETERMINING SHADOW FLICKER FROM A WIND TURBINE SYSTEM

(71) Applicant: VESTAS WIND SYSTEMS A/S, Aarhus (DK)

(72) Inventors: Mikkel Kåe Skovdal, Aarhus (DK); Morten Tim Thorsen, Tilst (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 17/361,104

(22) Filed: Jun. 28, 2021

(65) Prior Publication Data
US 2021/0404442 A1    Dec. 30, 2021

(30) Foreign Application Priority Data
Jun. 26, 2020  (DK) ................................ 2020 70420

(51) Int. Cl.
F03D 80/20  (2016.01)
F03D 7/02   (2006.01)
F03D 7/04   (2006.01)

(52) U.S. Cl.
CPC .......... *F03D 80/20* (2016.05); *F03D 7/0264* (2013.01); *F03D 7/048* (2013.01); *F05B 2270/19* (2013.01); *F05B 2270/326* (2013.01); *F05B 2270/327* (2013.01)

(58) Field of Classification Search
CPC ..... F03D 80/20; F03D 7/0264; F05D 2270/19
See application file for complete search history.

(56) References Cited

U.S. PATENT DOCUMENTS

| | | | |
|---|---|---|---|
| 6,661,111 B1 | 12/2003 | Wobben | |
| 2015/0115610 A1 | 4/2015 | Quinlan et al. | |
| 2015/0308406 A1* | 10/2015 | Li | G01J 1/0403 |
| | | | 250/236 |
| 2019/0003455 A1 | 1/2019 | Leyte-Vidal et al. | |
| 2019/0271296 A1 | 9/2019 | Rodriguez Jimenez et al. | |

FOREIGN PATENT DOCUMENTS

| | | |
|---|---|---|
| DE | 20023215 U1 | 5/2003 |
| EP | 3575597 A1 | 12/2019 |
| JP | 2019157633 A | 9/2019 |

OTHER PUBLICATIONS

Danish Patent and Trademark Office 1st Technical Examination for Application No. PA 2020 70420 dated Dec. 22, 2020.
European Patent Office, Extended European Search Report for Application 21177941.8 dated Nov. 19, 2021.

* cited by examiner

*Primary Examiner* — Topaz L. Elliott
*Assistant Examiner* — Michael K. Reitz
(74) *Attorney, Agent, or Firm* — Patterson + Sheridan, LLP

(57) ABSTRACT

The invention relates to a method for controlling a wind turbine system, more particular for a method for determining shadow flicker at a location and identifying a wind turbine in a wind park with a plurality of wind turbines causing the shadow flicker. A remote detector located at or near the location is determining the presence of shadow flicker and generating flicker data representative of the shadow flicker. A target wind turbine potentially causing a shadow at the location is identified based on the turbine position and the position of the sun. Operational data from the target wind turbine is obtained and it is verified whether the target wind turbine generates the shadow flicker by comparing the flicker data and the operational data.

17 Claims, 4 Drawing Sheets

METHOD FOR DETERMINING SHADOW FLICKER FROM A WIND TURBINE SYSTEM

FIELD OF THE INVENTION

The present invention relates to a method for determining shadow flicker at a location (e.g., a residence) and identifying a wind turbine in a wind park with a plurality of wind turbines causing the shadow flicker and mitigating the shadow flicker.

BACKGROUND OF THE INVENTION

A wind turbine may cause a shadow at a nearby residence, when the sun is shining. When the rotor of the wind turbine is rotating, the shadow caused at the nearby residence may flicker. This may occur if the sunlight hitting the residence passes through the rotor plane of a wind turbine in operation. The shadow flicker may be a nuisance for the people living at the nearby residence. A way to mitigate the shadow flicker is to pause the wind turbines; however, paused wind turbines are not producing power, which is undesirable.

As mentioned, shadow flicker may be caused by wind turbines, but it may for example also originate from trees swaying in the wind, cars on a nearby road, or some other moving object.

It is therefore desirable to have a method that can determine if the shadow flicker is caused by a wind turbine and identify the specific wind turbine or wind turbines. Thus, it gives the possibility only pausing a wind turbine, if it is causing the shadow flicker and thereby minimising lost power production.

SUMMARY OF THE INVENTION

It is an object of this invention to provide an improved method to determine shadow flicker from a wind turbine.

In particular, it may be seen as an object of the present invention to provide a method to determine when a wind turbine is causing shadow flicker at a residence and thereby making it possible to take appropriate measures to mitigate the shadow flicker.

Thus, the above-described objects and several other objects are intended to be obtained in a first aspect of the invention by providing a method for determining shadow flicker at a residence and identifying a wind turbine in a wind park with a plurality of wind turbines causing the shadow flicker, the method comprising the steps of:
  determine the presence of shadow flicker at the residence and generating flicker data representative of the shadow flicker,
  identify at least one target wind turbine potentially causing shadow flicker at the residence based on the wind turbine position and the position of the sun,
  generate operational data from the at least one target wind turbine,
  verify that the shadow flicker is generated by the at least one target wind turbine by comparing the flicker data and the operational data.

The invention is particularly, but not exclusively, advantageous for obtaining an accurate determination of shadow flicker at the residence. It provides a method that secures the shadow flicker does not originate from other source than a wind turbine in the wind park and identifies the specific wind turbine or wind turbines that is causing the shadow flicker at the residence. Hereby, making it possible taking minimal mitigating measures, such as only pausing a wind turbine if it indeed is causing the shadow flicker. Positioning data, on the position of the sun and position of the wind turbine, may be used to calculate, whether a shadow is hitting a residence.

When determining the presence of shadow flicker at the residence, diffuse light or obstacles as trees or buildings may result in that, there is no shadow flicker at the residence, and therefore, no need to pause the wind turbine. During diffuse light, the sun's light radiation may be such that shadow flicker may not actually occur. Diffuse light is not a nuisance for the person staying at the residence, if the diffuse light do not create shadow flicker, but with a light sensor at the wind turbine, the diffuse light may cause an incorrect determination of shadow flicker.

Trees, placed between the wind park and the residence, may prevent the shadow flicker from the wind turbine to reach the residence. In addition, at different times of the year, when trees have leaves, the trees may prevent the sunlight, and thereby the shadow flicker, to hit the residence. Since trees, possible blocking the shadow flicker, changes appearance during the year due to leaves, and over the years, as trees are growing, a prior art method, with a light sensor at the wind turbine, will not be able to detect when trees or other obstacles prevent the shadow flicker from reaching the residence.

The method of this invention may use a remote detector located at, or near, the residence for determine shadow flicker. Placing a remote detector at the residence to determine shadow flicker, may be a reliable way accurately determining, whether there is shadow flicker at the residence. The remote detector, at the residence, determines the shadow flicker directly, and therefore a method to determine, whether diffuse light at the wind turbine is causing shadow flicker at the residence, is not needed.

It is to be understood that the data generated at the residence, e.g. by the remote detector, can be processed for determining shadow flicker at the residence in a computer positioned at, or near, the residence or away from the residence. The shadow flicker determination can for example be done by a computer situated at the site of the wind park or a central computer system preferably having control access to the wind park.

The computer may use the position of the sun, the position of the wind turbines in a wind park and the position of the residence to determine that there is a possibility of shadow flicker at the residence and then determine whether shadow flicker actually is occurring at the residence.

When shadow flicker at the residence has been determined, the next step is to identify the target wind turbine potentially causing the shadow at the residence based on the wind turbine position and the position of the sun. From the position of the sun and the wind turbine position, the position of the shadow can be estimated, and it can be estimated whether the shadow caused by a wind turbine is actually hitting the residence. The step is to estimate the position of the shadow for each wind turbine in the wind park and identify whether one or more of the wind turbines is causing a shadow to hit the residence. It is to be understood that the position of the sun may be determined based on the time and preferably the date. This could be based on a table defining the presence of the shadow based in the hour of the day and if needed the date.

From the wind turbine(s) identified as causing shadow flicker at the residence operational data are generated. The operational data may comprise the rotational speed of the rotor(s) of the wind turbine(s) and it may comprise the position of the rotor(s) at a given time for instance by a sensor at the tower registering the time when a rotor blade is passing the tower.

Finally, it can be verified that the target wind turbine generates the shadow flicker by comparing the flicker data and the operational data.

According to an embodiment, the method comprises that the shadow flicker is mitigated by pausing the target wind turbine verified to cause the shadow flicker.

If shadow flicker is determined at a residence, the target wind turbine, verified to cause the shadow flicker, may be paused to mitigate the shadow flicker. In one example, pausing the wind turbine causes the rotor to stop moving. In another example, pausing the wind turbine still allows the rotors to rotate slowly; the shadow flicker is still mitigated. In yet another example the shadow flicker is mitigated by yawing the wind turbine. These examples may be combined in any suitable way.

In an embodiment, the pausing of the wind turbine may be delayed, e.g. a few minutes, to ensure that the shadow flicker is continuous, and not just caused by, for instance, a short opening in the clouds allowing sun light to hit the residence just to disappear again shortly after. This can be done to avoid continuously pausing and starting the wind turbine verified to cause the shadow flicker. Alternatively, the wind turbine may be paused immediately.

According to an embodiment, the method comprises that the flicker data comprises detected oscillations in the light intensity at the residence.

The flicker data represents the shadow flicker at the residence. The flicker data may comprise the detected oscillations in the light intensity; the oscillations may be represented by a frequency of the oscillations of the light intensity caused by the shadow flicker.

When detecting oscillation in the light intensity, the difference between a highest light intensity and the lowest light intensity may have to be higher than a threshold value, avoiding small oscillations that is not a nuisance to the person staying at the residence, causing the target wind turbine to be paused. In an embodiment, the flicker data may be determined and recorded by a remote detector at, or near, the residence.

According to an embodiment, the method comprises that each wind turbine comprises a rotor, and the operational data comprises the rotor speed of the at least one target wind turbine.

The rotor speed may be used to determine the frequency of the shadow flicker caused by the wind turbine. The frequency determined from the rotor speed may then be compared to the frequency in the oscillation of the shadow flicker at the residence. If the frequency of the detected oscillations and the rotor speed do not match, the target wind turbine is taken not to cause the determined shadow flicker, and the target wind turbine therefore do not need to be paused.

According to an embodiment, the method comprises that each wind turbine comprises a rotor, and the operational data comprises the angular position of a blade of the rotor of the at least one target wind turbine.

In a wind park, all wind turbines may be rotating the rotors substantially with the same rotor speed and therefore causing the same oscillations in the light intensity. It may therefore be advantageous to verify the target wind turbine, among a plurality of wind turbines, by comparing the angular position of the blades of the rotor to the flicker data from the remote detector. Preferably, the operational data from the wind turbines, as well as the flicker data from the remote detector, have a synchronous time registration making it easier to compare the angular position of a blade and the shadow flicker occurring at the residence.

According to an embodiment, the method comprises that the verifying involves determining, if the oscillations in the light intensity and the angular position of the blades are synchronic.

The advantage, of using the angular position of the rotor blades, is that the angular position may be different for different wind turbines, making it possible to distinguish between different wind turbines to verify the target wind turbine.

Then it also can be verified that the wind turbine, actually causing the shadow at the residence, is the same wind turbine that is identified by using the position of the sun to determine that the shadow hits the residence. Especially, if more than one wind turbine may cause a shadow at the residence, the wind turbine causing the shadow flicker can be identified by determine synchronicity between the oscillations and the rotor positions.

According to an embodiment, the method comprises that the presence of shadow flicker at the residence is determined by a remote detector located at the residence.

The remote detector, at the residence, may determine the shadow flicker and generate the flicker data. Preferably by detecting changes in the light intensity, e.g. oscillations in the light intensity. The remote detector may then transmit the flicker data to a wind power plant control system.

The remote detector may be a stationary detector placed at, or near, the residence. The remote detector may be placed on the roof or at a wall of the residence, or the remote detector is placed nearby the residence. There may be more than one remote detector at a residence. This may be beneficial as the shadow changes position through the day and a remote detector placed at, or nearby, the residence may not determine, if shadow flicker is hitting another part of the residence.

According to an embodiment, the method comprises that the remote detector is a portable device comprising at least a light intensity sensor and a GPS locator.

The remote detector may be a portable device that can be move around to different positions. The advantage of a portable device is that the person staying at the residence can move the portable device, as the shadow caused by a wind turbine can change position as the sun moves. By being able to move the remote detector, the person staying at the residence may ensure that the shadow flicker is determined at the location, where the person actually is present. The exact location of the portable device is determined by a GPS signal sent from the portable device.

According to an embodiment, the method comprises that the portable device is a mobile phone.

The portable devise can be a mobile phone, preferably, comprising an app for determine shadow flicker and for transmitting the flicker data to a wind power plant control system.

Shadow flicker not origination from the wind turbines may originate from many different sources like trees or branches waving in the wind or the shadow flicker may originate from a person attempting to tamper with the detecting means by producing a shadow flicker waving in front of the remote detector wanting to pause the wind turbines. The verification process ensures that wind turbines will not be paused unless it is actually a wind turbine causing the shadow flicker.

According to an embodiment, the method comprises that the target wind turbine verified to cause shadow flicker resumes normal operation when determined that the target wind turbine will no longer cause shadow flicker at the residence.

When a wind turbine has been paused, the shadow of the wind turbine may still be observed, and when it is determined that the shadow is moved away from the residence or disappeared, then the wind turbine again can be activated and resume normal operation because the target wind turbine no longer causes shadow flicker at the residence. That the shadow is moved away from the residence can be calculated from the position of the sun. The shadow flicker disappears, when the sun has moved sufficiently, for the shadow to move away from the residence. Further, the shadow can disappear because clouds have appeared, between the target wind turbine and the residence, determined by no longer measuring any sun light at the wind turbine or at the residence.

According to an embodiment, the method comprises that the target wind turbine resumes normal operation when determined that the portable device no longer is present at the residence.

When the portable device, which may be a mobile phone, is no longer present at the residence, it may be assume at the resident no longer is at the residence and therefore the operation of the target wind turbine may be resumed, as it is no longer affecting the resident.

In a second aspect, the invention relates to a detector system to determine shadow flicker at a residence in the vicinity of a wind park comprising a plurality of wind turbines, the detector system comprises a wind power plant control system and a remote detector, wherein
    the remote detector generates data which is processed to generate flicker data representative of the shadow flicker at the residence,
    the wind power plant control system identifies at least one target wind turbine potentially causing a shadow at the residence based on the wind turbine position and the position of the sun, and generate operational data, of the at least one target wind turbine, and
    verifies that the shadow flicker is generated by the at least one target wind turbine by comparing the flicker data and the operational data.

The detector system to determine shadow flicker according to the second aspect of the invention may be modified to perform the method steps as mentioned above according to the first aspect.

A third aspect of the invention relates to a control system for determining shadow flicker of a wind turbine, where the control system is arranged to perform the steps according to the method of the first aspect.

A fourth aspect of the invention relates to a computer program product comprising software code adapted to control a wind turbine when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE FIGURES

Embodiments of the invention will be described, by way of example only, with reference to the drawings, in which.

DETAILED DESCRIPTION OF AN EMBODIMENT

Figure 1:
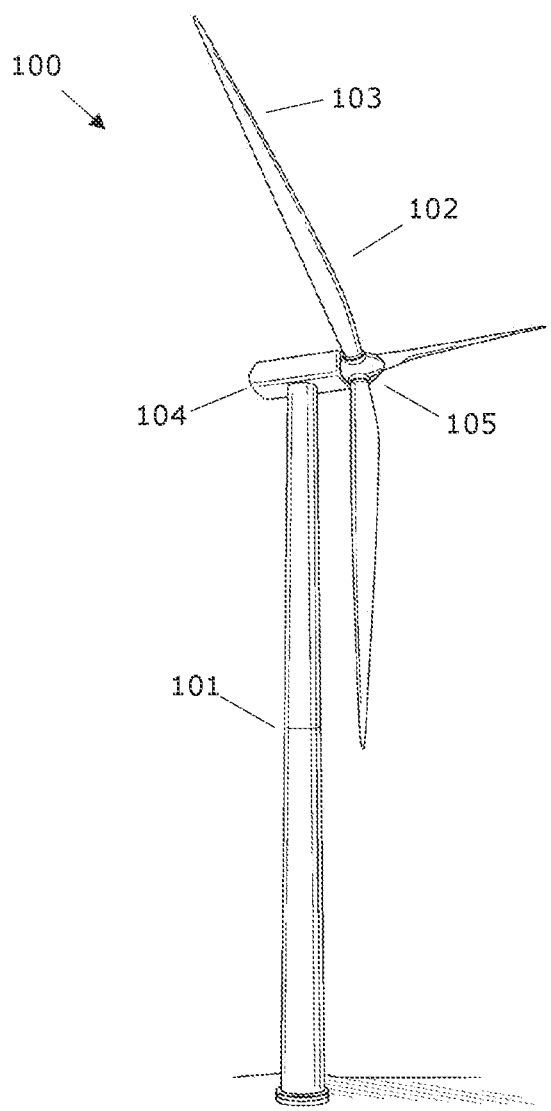
FIG. 1 illustrates a wind turbine.

FIG. 1 shows a wind turbine 100 (also commonly referred to as a wind turbine generator, WTG) comprising a tower 101 and a rotor 102 with at least one rotor blade 103. Typically, three blades are used, but a different number of blades can also be used. The blades 103 are connected with the hub 105, which is arranged to rotate with the blades. The rotor is connected to a nacelle 104, which is mounted on top of the tower 101 and being adapted to drive a generator situated inside the nacelle 104 via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator.

Figure 2:
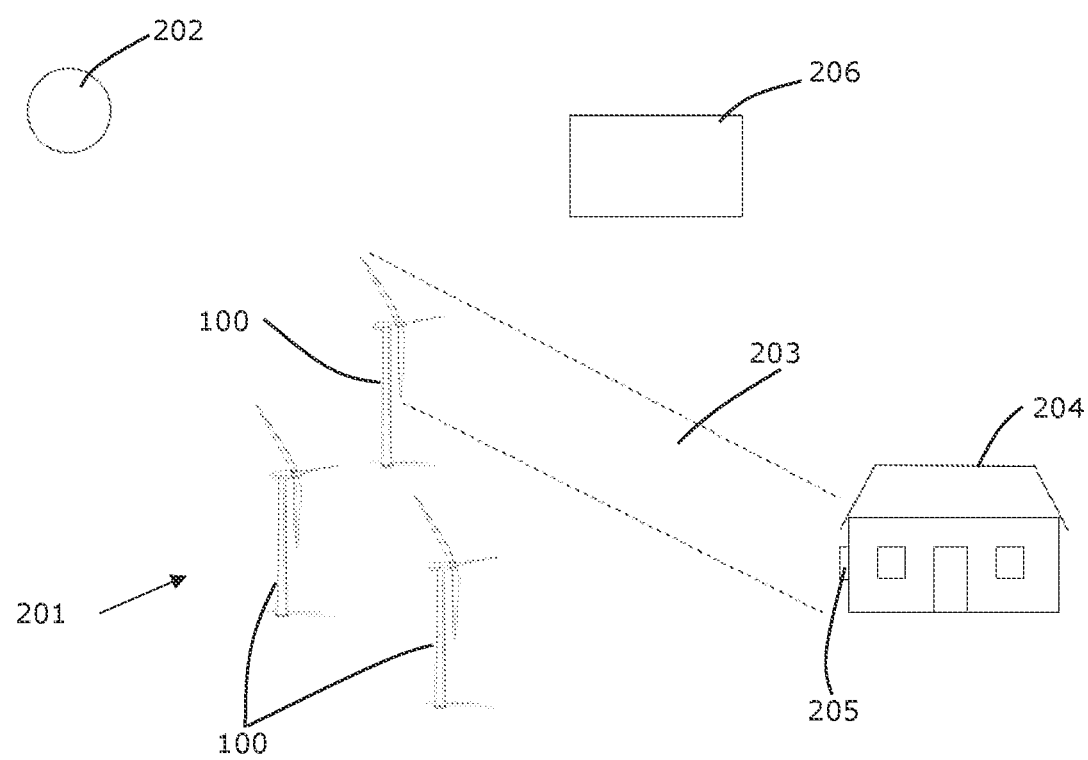
FIG. 2 illustrates a wind turbine in a wind park causing shadow flicker at a residence.

FIG. 2 shows a wind park 201 comprising a plurality of wind turbines 100. When the sun 202 is shining the wind turbines 100 cause shadows 203, which may, when the sun 202 is in a certain position, hit a residence 204. When the rotor 102 is rotating, the shadow 203 may cause shadow flicker, causing nuisance to a person staying at the residence 204. At, or near, the residence 204, a remote detector 205 is located. The remote detector 205 is adapted to determine changes in light intensity. The remote detector 205 may for example be able to detect light oscillation at a frequency similar to the frequency expected from a specific wind turbine 100 in the wind park 201. The data generated by the remote detector 205 can then be analysed to detect the presence of shadow flicker and flicker data can be generated. Flicker data may comprise information of the frequency of the flicker. It could also or alternatively comprise one of the following; position of the residence, presence of shadow flicker, amplitude of the light intensities, one or more of height, polar angle, and azimuthal angle of the detector.

When shadow flicker at a residence 204 is determined, target wind turbines 100, which may cause shadow flicker at the residence 204, are identified from the position of the sun 202 and from the position of each wind turbine 100 in the wind park 201. A wind park 201 comprises a number of wind turbines 100, and it is possible that more than one wind turbine 100 is causing shadow flicker at the residence 204. Further, it can be difficult and includes some uncertainty, which wind turbines 100 are actually causing shadow flicker at the residence 204. Therefore, a verification process to verify which wind turbine 100 is actually causing the shadow flicker may be needed.

To perform the verification, flicker data 301 is generated and transmitted to a wind power plant control system 206. The flicker data 301 may comprise light intensity and the frequency of the oscillations of the light intensity. The wind turbine 100 generates operational data 306 and transmit the operational data 306 to the wind power plant control system 206. The operational data 306 may comprise rotation speed of the wind turbine 100 and the position of the rotor blades 103. The position of the rotor blades 103 may be detected by registering the time, when a rotor blade 103 is passing the tower 101. The wind power plant control system 206 analyses and compares the flicker data 301 and the operational data 306 to verify the wind turbine 100 causing the shadow 203.

The remote detector 205 may be a stationary detector, for instance placed at the residence 204. The remote detector 205 may also be a portable device for instance a mobile phone carried be a person staying at the residence 204. The person staying at the residence 204 then may place the portable device in a position, where it may determine shadow flicker. The portable device may comprise a camera, using the camera to record the shadow flicker. The portable device may determine shadow flicker only at the exact location the person is, and therefore there is no need for pausing the target wind turbine 100, if the shadow flicker is not present, where the person is, even though shadow flicker may be present elsewhere at the residence.

Figure 3:
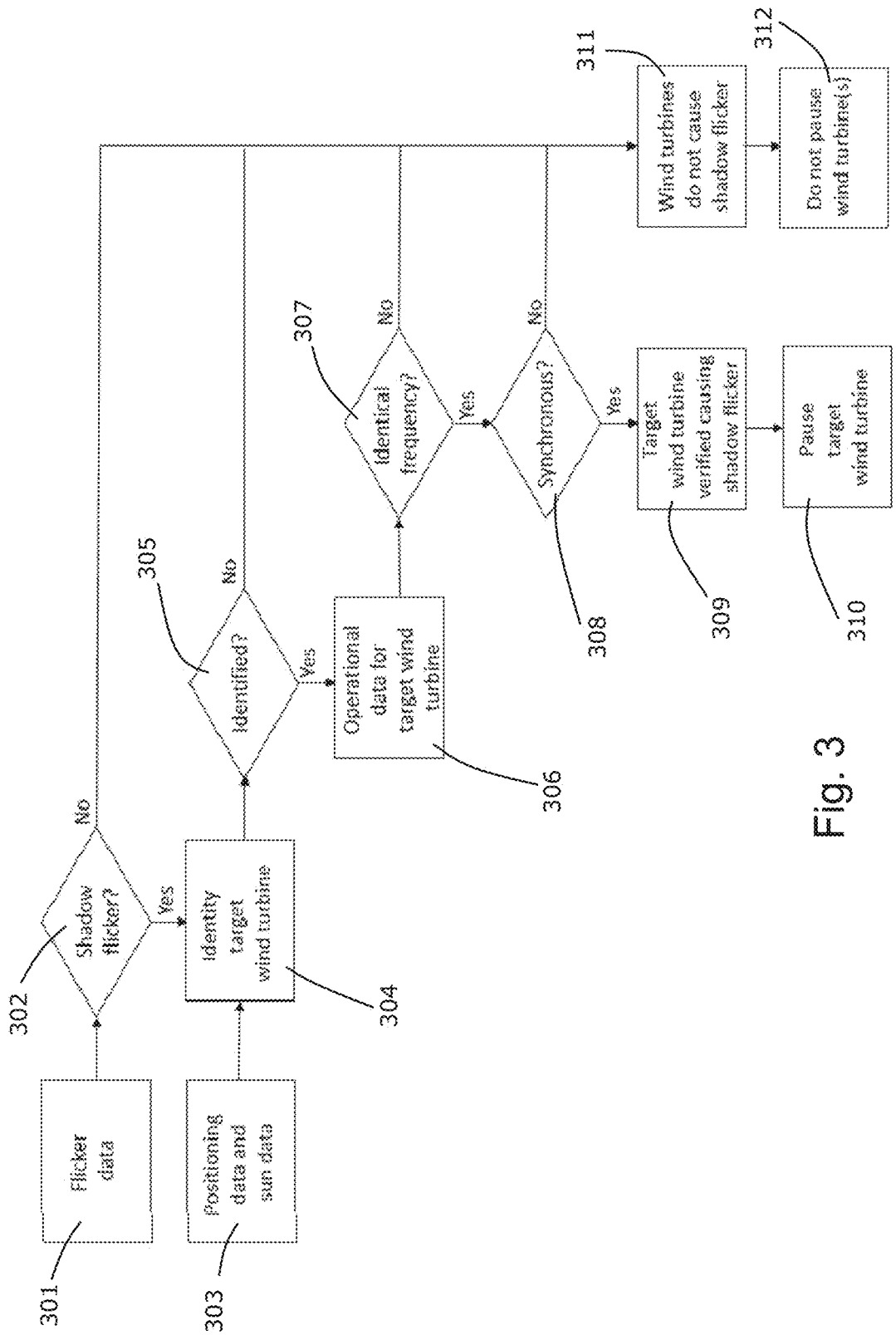
FIG. 3 illustrates a wind power plant control system according to an embodiment of the invention.

FIG. 3 shows a diagram illustrating a possible implementation of the functionality of the invention. Flicker data 301 is received and it is determined whether the received flicker data 301 comprises information that shadow flicker occur 302. The flicker data may be generated based on data recorded by a sensor at, or near, the residence. If shadow flicker occur, then based on positioning data and sun data 303 the target wind turbine(s) 100 is/are identified 304 as possibly causing shadow flicker at the residence 204 by using the position of the sun 202 and the position of the wind turbines. For target wind turbines 100 identified 305, operational data 306 from each target wind turbine 100 is used to checks whether the oscillations in the flicker data 301 and the rotation speed of the target wind turbine 100 have identical frequencies 307. If they have identical frequencies, then it is checked whether the oscillations in the flicker data 301 and the position of the rotor blades 103 in the operational data are synchronous 308. If they are synchronous, then it is verified that the target wind turbine 100 is causing the shadow flicker 309 on the residence, and the target wind turbine 100 therefore is paused 310. Otherwise, if it is not verified, then the target wind turbine 100 do not cause shadow flicker 311, and the method do not pause the wind turbine 312.

The synchronous test may be done by finding the time difference between the time registered in the operational data 306 for a rotor blade 103 passing the tower 101, and the time registered in the flicker data 301, where the light intensity reaches a minimum intensity. The time difference is then compared to the time it will take for the rotor blade 103 to move from the position, where it is directly between the sun 202 and the remote detector 205, to the position passing the tower 101. If the time differences match the synchronous test, then the target wind turbine 100 may by paused.

When the target wind turbine 100 is paused, the remote detector 205 continues to detect the intensity of the sun light. If the sun light disappears, then the remote detector 205 may transmit a message and the target wind turbine 100 can resume normal operation. If the remote detector is portable, for instance a mobile phone, it can be detected, when the portable remote detector is moved away from the residence, and the target wind turbine 100 can resume normal operation. In addition, the shadow caused by the target wind turbine 100 may be continuously monitored at the location of the residence 204, or the position of the shadow can be calculated from the movement of the sun 202 and when the shadow 203 moves away from the residence 204, the normal operation of the target wind turbine 100 is resumed.

Figure 4:
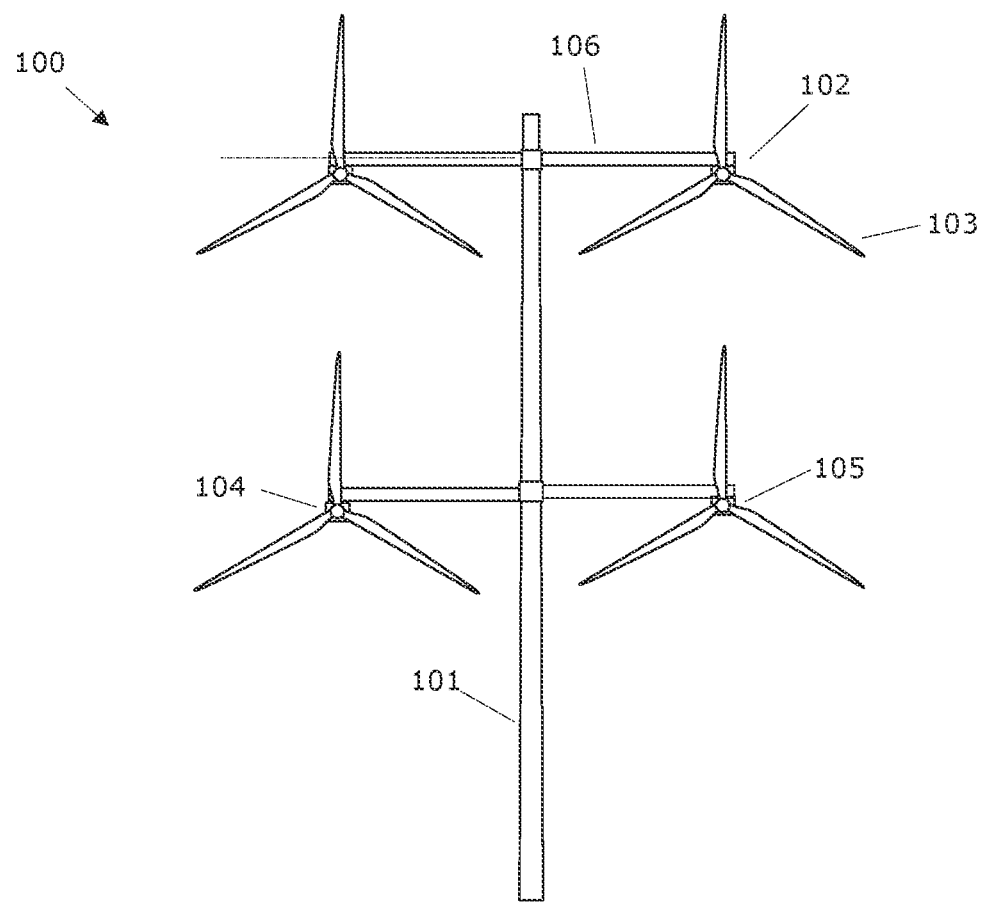
FIG. 4 illustrates wind turbines configured as multi-rotor wind turbines.
Figure 4:
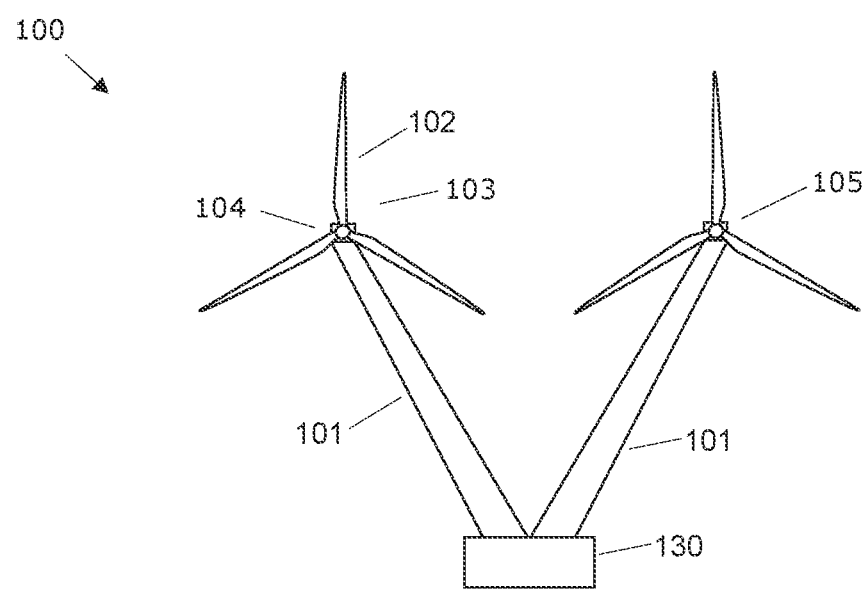

FIG. 4 shows alternative wind turbines 100 configured as multi-rotor wind turbines. Multi-rotor wind turbines comprises a plurality of nacelles 104. The nacelles 104 can be supported, as illustrated in the upper drawing, via a tower 101 and support arms 106 extending outwardly from the tower 101 so that the nacelles are placed away from the tower and on opposite sides of the tower. Alternatively, as illustrated in the lower drawing, the nacelles 104 can be supported by angled towers 101 extending from a foundation 130, e.g. a ground or floating foundation, so that two or more nacelles 104 are sufficiently separated from each other at a given height. Embodiments of the present invention may also be used with multi-rotor wind turbines. The method can be used to not only identify and verify, if a specific multi wind turbine is causing shadow flicker at a residence, but also be used to determine the specific rotor or rotors causing the shadow flicker. In this way in can be ensured that only the rotors causing the shadow flicker are paused.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way, such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method comprising:
    determining a presence of shadow flicker at a location;
    generating flicker data representative of the shadow flicker;
    identifying at least one target wind turbine potentially causing shadow flicker at the location based on a position of the at least one target wind turbine and a position of the sun;
    generating operational data from the at least one target wind turbine;
    verifying that the shadow flicker is generated by the at least one target wind turbine by comparing the flicker data and the operational data; and
    pausing operation of the at least one target wind turbine verified to cause the shadow flicker.

2. The method of claim 1, wherein the flicker data comprises detected oscillations in light intensity at the location.

3. The method of claim 1, wherein the at least one target wind turbine comprises a rotor, and the operational data comprises a rotor speed of the rotor.

4. The method of claim 1, wherein the at least one target wind turbine comprises a rotor, and the operational data comprises an angular position of a blade of the rotor.

5. The method of claim 4, wherein, the verifying involves determining, if oscillations in light intensity and the angular position of the blades are synchronic.

6. The method of claim 1, wherein the at least one target wind turbine verified to cause shadow flicker resumes normal operation when determined that the at least one target wind turbine will no longer cause shadow flicker at the location.

7. The method of claim 1, wherein the presence of shadow flicker at the location is determined by a remote detector located at the location.

8. The method of claim 7, wherein the remote detector is a portable device comprising at least a light intensity sensor and a GPS locator.

9. The method of claim 8, wherein the portable device is a mobile phone.

10. The method of claim 8, further comprising:
upon determining that the portable device is no longer present at the location, resuming normal operation of the target wind turbine.

11. A detector system to determine shadow flicker at a location in a vicinity of a wind park comprising a plurality of wind turbines; wherein the detector system, comprises:
a remote detector configured to process data to generate flicker data representative of the shadow flicker at the location; and
a wind power plant control system communicatively coupled to the remote detector and configured to:
identify at least one target wind turbine of the plurality of wind turbines potentially causing a shadow at the location based on a position of the at least one target wind turbine and a position of the sun;
generate operational data of the at least one target wind turbine;
verify that the shadow flicker is generated by the at least one target wind turbine by comparing the flicker data and the operational data; and
pause operation of the at least one target wind turbine verified to cause the shadow flicker.

12. The detector system of claim 2, wherein the flicker data comprises detected oscillations in light intensity at the location.

13. The detector system of claim 2, wherein the at least one target wind turbine comprises a rotor, and the operational data comprises a rotor speed of the rotor.

14. A computer program product comprising a non-transitory computer readable medium storing software code adapted to control a wind turbine system when executed on a data processing system, the computer program product being adapted to perform an operation for determining shadow flicker caused by at least one wind turbine of a plurality of wind turbines, the operation comprising:
determining a presence of shadow flicker at a location;
generating flicker data representative of the shadow flicker;
identifying at least one target wind turbine, of the plurality of wind turbines, potentially causing shadow flicker at the location based on a position of the at least one target wind turbine and a position of the sun;
generating operational data from the at least one target wind turbine;
verifying that the shadow flicker is generated by the at least one target wind turbine by comparing the flicker data and the operational data; and
pausing operation of the at least one target wind turbine verified to cause the shadow flicker.

15. The computer program product of claim 14, wherein the flicker data comprises detected oscillations in light intensity at the location.

16. The computer program product of claim 14, wherein the at least one target wind turbine comprises a rotor, and the operational data comprises a rotor speed of the rotor.

17. The computer program product of claim 14, wherein the at least one target wind turbine comprises a rotor, and the operational data comprises an angular position of a blade of the rotor.

* * * * *